Sept. 16, 1958  C. G. MALLERY ET AL  2,852,212
AUTOMATIC AND MANUAL CONTROL APPARATUS FOR AIRCRAFT
Filed April 11, 1955
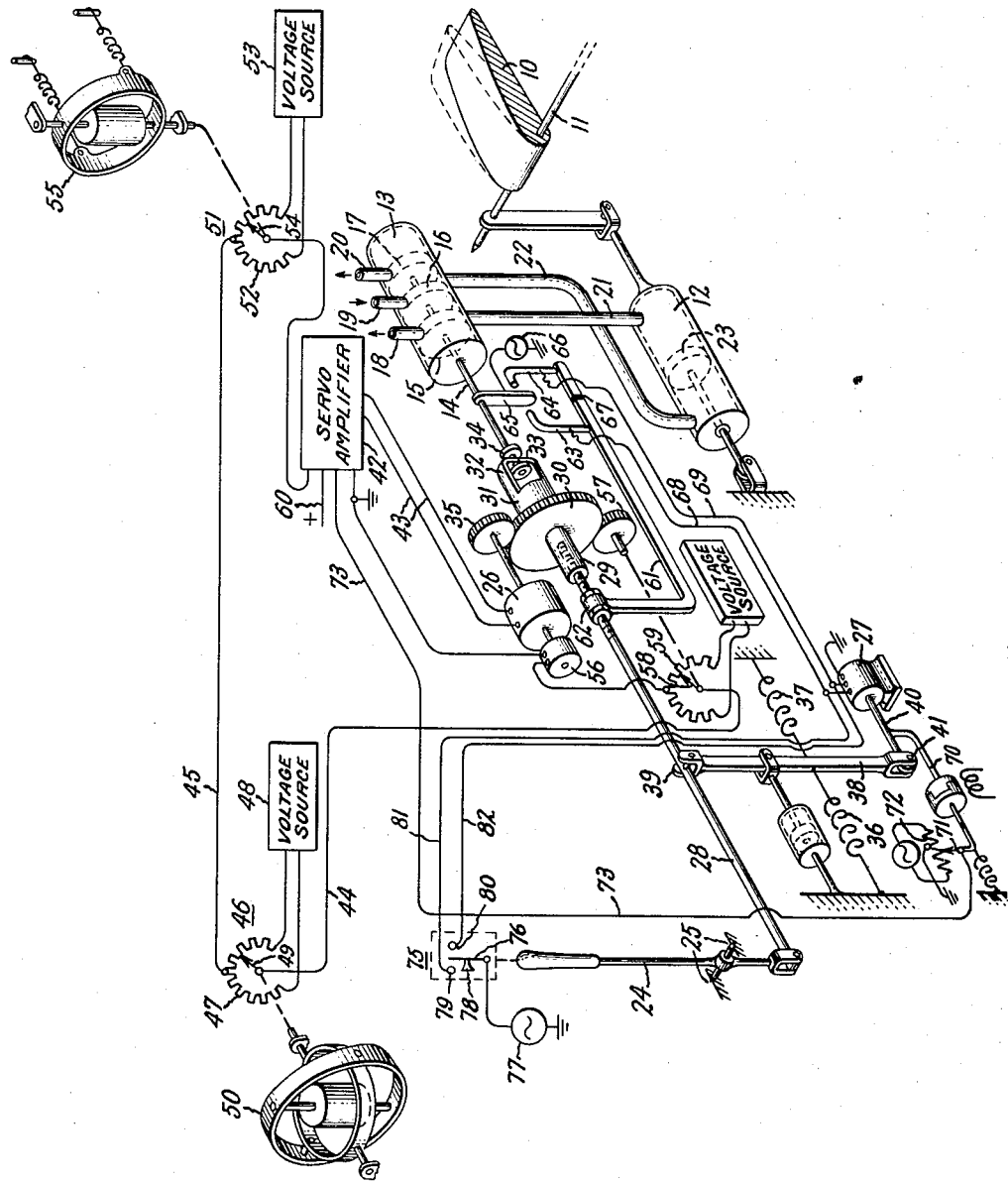
Inventors:
Frederick R. Radcliffe,
Charles G. Mallery,
by *Their Attorney.*

United States Patent Office 2,852,212
Patented Sept. 16, 1958

2,852,212

AUTOMATIC AND MANUAL CONTROL APPARATUS FOR AIRCRAFT

Charles G. Mallery and Frederick R. Radcliffe, Schenectady, N. Y., assignors to General Electric Company, a corporation of New York Application April 11, 1955, Serial No. 500,482

16 Claims. (Cl. 244—76)

This invention generally relates to improvements in control systems for dirigible craft, and more particularly to a system for both automatically stabilizing a craft in motion while enabling superimposed manual maneuvering and automatic maneuvering thereof.

Whereas the present invention may be employed with any servo system having a movable member to be controlled or with any craft whose position, attitude, altitude or the like is controllable by movable members, it finds particular applicability to the control of dirigible craft such as aircraft, and preferred embodiments of this invention will be so described hereinafter.

For both automatically stabilizing an aircraft in a preselected attitude and automatically controlling maneuvers thereof, as well as enabling superimposed manual maneuvers by the human pilot, it has been heretofore known to employ three actuators in the control linkage interconnecting the human pilot's "joy stick" and the aircraft controlling surface. The first of these, generally and descriptively termed a "damper actuator," has comprised a high speed, relatively short travel device connected in series with the linkage and energized by suitable gyro instruments or the like for rapidly positioning the aircraft surface in the proper direction to correct or damp out aircraft transient movement or oscillations such as yaw. A second of these actuators, generally and descriptively termed a "maneuvering actuator," has been a slower speed, long travel, positioning device energized by suitable autopilot instruments and connected to operate the linkage in parallel with the pilot's "joy stick" and position the aircraft surfaces greater distances for maneuvering the aircraft. Being in series with the pilot's "joy stick," movement of the "damper actuator" does not move the "joy stick" for this fast-acting damping movement, but only the control surface. However, the maneuvering actuator on the other hand has heretofore been connected to both position the aircraft surface and "joy stick" together for the purpose of allowing the stick to follow the slower movements of the aircraft and hence inform the human pilot of the aircraft maneuvers.

Still a third actuator heretofore provided, termed a "feel trim actuator," has been a positioning device remotely operated by the human pilot for displacing the linkage and the "joy stick" and hence the aircraft surface against its spring restrained linkage for the purpose of relieving the pilot of steady state positioning of this stick if a displacement of long duration is desired; as for example, if the aircraft surface needs to be trimmed or displaced from streamline position to compensate for aircraft load unbalance.

However, with this prior arrangement, each of these three actuators operates more or less independently of each other and of the human pilot's manual control of the "stick." As a result, if the "maneuvering actuator" is energized, the human pilot is compelled to overcome or overpower this actuator to perform manual maneuvers. Similarly, the pilot is required to "trim" the aircraft or in other words to manually control the "feel trim" actuator to adjust the steady state position of the control surface to compensate for aircraft weight unbalance or the like. Still other disadvantages of these systems are the usual requirement for cancelling the position feedback signal from the aircraft control surface to the automatic pilot to eliminate errors, as well as the not inconsiderable added weight, expense and complexity, resulting from the use of three actuators and the position feedback pickoffs and cancelling mechanism and wiring.

In accordance with the present invention, a new system is proposed that eliminates the "maneuvering actuator" heretofore used as a separate component by interconnecting the "damper actuator" and "feel trim actuator" in a novel manner, enabling the "damper actuator" and "feel trim actuator" to be jointly employed for not only their former functions, but together as a hybrid maneuvering actuator having both a high-frequency short movement for rapid control and a long movement control for greater maneuvering changes. Furthermore, this arrangement provides the additional function of simplifying the pilot's manual takeover, enabling manual takeover control at any time with ease, as well as automatic trimming of the aircraft surface.

It is accordingly one object of the present invention to provide an improved system for both automatically positioning a member while enabling superimposed manual positioning thereof.

A further object of the present invention is to provide an improved control system for both automatically stabilizing a craft in motion while enabling superimposed manual and automatic maneuvering thereof.

A further object of the invention is to provide a system for stabilizing and maneuvering a craft that is lighter in weight, faster acting, and more fully automatic than prior systems.

A still further object of the invention is to provide a stabilizing and maneuvering control system for a craft in motion having automatic trimming of the craft's position controlling member.

A still further object of the invention is to provide an improved control system for both automatically stabilizing, automatically maneuvering, and enabling superimposed manual maneuvering of a craft in motion.

Another object of this invention is to provide a light weight, rapidly acting, and highly sensitive positioning control system.

Other objects and many attendant advantages of this invention will be more readily comprehended by those skilled in the art upon a detailed consideration of the following specification, taken with the accompanying drawing schematically illustrating a single channel control system for an aircraft embodying the present invention.

Referring now to Fig. 1 for a detailed consideration of one preferred system embodying the present invention, the aircraft control surface 10, such as a rudder, elevator, or aileron, as shown, may be reversibly positioned by shaft 11 about its axis by means of a conventional hydraulically-driven power boost actuator 12, reversibly operated by a control valve 13 in response to reciprocal movement of the valve stem 14.

Valve stem 14 may be positioned either manually by the conventional "joy stick" 24 or manual stick controller, or may be automatically positioned by energizing a "damper actuator" motor 26 or "feel trim actuator" motor 27.

For manually controlling the position of control surface 10, the valve stem 14 is axially displaced by pivoting the human pilot's manual controller 24 about its pivots 25. Pivoting the manual controller 24 positions an elongate shaft or push rod 28 whose opposite end is threadably fastened within a sleeve 29 on which is mounted a spur gear 30. At the opposite end of sleeve 29 is connected a substantially U-shaped member 31 having two confronting teeth 32 and 33, rotatably engaging a spool 34 affixed to valve stem 14 so that sleeve 29 cannot move axially or lengthwise with respect to valve stem 14, although the two members can rotate with respect to each other. Thus, pivotal movement of the manual controller 24 about its pivots 25 directly positions valve stem 14 into and out of the valve 13 through the connecting mechanism comprising elongate push rod 28, sleeve 29, U-shaped member 31, and spool 34.

Meshing with the spur gear 30 and positioned above this gear is a second spur gear 35 driven by the "damper actuator" motor 26. Upon rotation of motor 26, the spur gear 35 drives gear 30 and sleeve 29 connected thereto, causing threaded sleeve 29 to be drawn up onto or further off of the threads of push rod 28, thereby either shortening the effective length of push rod 28 or lengthening the effective length thereof, and correspondingly moving valve stem 14 into or out of control valve 13. In other words, push rod 28, sleeve 29, and valve stem 14 form a mechanical linkage which is expandable and contractable in response to rotation of motor 26, thereby moving valve stem 14 into and out of control valve 13 in response to energization of motor 26. This latter mechanism, including motor 26 and its associated gearing 30, 35 and threaded sleeve member 29 forming the means for expanding or contracting the effective length of push rod 28, may best be termed the "damper actuator" mechanism, and will be so referred to hereinafter. It is to be particularly noted that this damper actuator mechanism operates in series with the pilot's control stick 24 for controlling the position of aircraft surface 10, thereby enabling the operation of the pilot's manual controller 24 without having to overcome the effect of this mechanism.

Thus, it is observed that valve 14 may be displaced to control the position of the craft surface 10 by either manually positioning the pilot's hand controller 24 or by electrically energizing servomotor 26 to cause rotation thereof, manual displacement of the pilot's hand controller resulting in the axial or longitudinal movement of the entire linkage interconnecting the hand controller 24 and valve stem 14, whereas electrical energization of motor 26 results in the length of this interconnecting linkage being either lengthened or shortened, to further withdraw or insert valve stem 14 into or out of the control valve 13. To prevent interaction between these alternatively or concurrently acting positioning devices, the hand controller 24 and related linkage are provided with an adjustable centering device, such as the two centering springs 36 and 37, one on either side of a substantially vertical link 38 pivotally connected at upper junction 39 with push rod 28. These springs act in opposition to oppose longitudinal movement of this hand controller and push rod linkage and normally center these members. Since the force provided by the centering springs 36 and 37 is much greater than the force needed to position valve stem 14 into and out of valve 13, the expansion and contraction of the overall length of the push rod linkage and sleeve 29 in response to rotation of servomotor 26 is not reflected back to position the manual controller member 24, but merely positions the stem 14 of control valve 13, leaving the manual controller 24 in its centered position. In other words, rotation of the servomotor 26 does not move the push rod 28 axially, but merely threads the sleeve 29 further onto the push rod or further off of the push rod, thereby positioning the valve stem 14 without any following movement of the manual controller 24.

Still a third manner of positioning the push rod 28 and its associated members to displace the aircraft control surface 10 is by means of the "feel trim" motor 27 whose reciprocally acting shaft 40 is pivotally connected at lower junction 41 to the opposite end of the substantially vertically arranged link 38. Longitudinal movement of motor shaft 40 displaces this lower end of link 38 and due to the relative stiffness of the centering springs 36 and 37 acting in this instance as a pivot, permits the upper end of link 38 connected to push rod 28 at junction 39 to move, thereby driving push rod 28 and its associated linkage to position stem 14 into and out of valve 13.

Centering springs 36 and 37 and vertical link 38, therefore, perform a dual function for, when the human pilot manually positions the "joy stick" 24, the vertical link 38 is pivoted about its lower end junction 41 and the springs 36 and 37 serve as centering means for the push rod 28 and the "joy stick," and also supply an "artificial feel" force against movement of the stick by the human pilot simulating the same effect to him as if the control surface 10 were being displaced against wind resistance without the aid of the power boosting valve 13 and hydraulically-operated driving motor 12. On the other hand, these springs 36 and 37 serve to hold a portion of link 28 in a fixed location and movement of the "feel trim" motor shaft 40 pivots this link about the spring-held position to enable this movement to be reflected at the upper end of link 38 and thereby axially drive the push rod 28 for controlling the position of the aircraft control surface 10.

Thus, it is observed that valve stem 14 may be displaced to control the position of the craft movable surface 10 by any one or all of three mechanisms; by movement of the human pilot's manual controller 24, by energization of the "damper actuator" motor 26, or by energization of the "feel trim" actuator motor 27. It is to be particularly noted that all of these three mechanisms are mechanically independent, whereby any one or all of these mechanisms may be energized separately or together, without interference by the others or without overcoming an additional force supplied by the others.

*Automatic stabilization and maneuvering*

For automatically stabilizing the aircraft, the damper actuator motor 26 may be energized by any of the known automatic pilot or stabilizing system components, and for purposes of illustration is shown as being energized by the output of a servo amplifier 42 over output lines 43 leading therefrom, in response to the resultant sum of a plurality of electrical control signals that may be connected in series or in parallel to energize the servo amplifier input lines.

The first of these signals is directed from output lines 44 and 45 of an electrical pickoff 46, which may simply comprise a potentiometer 47 having its fixed terminals energized by voltage source 48 and the reversible polarity output voltage thereof taken from its movable slider 49 in relation to its fixed center tap over line 45. The movable slider 49 may be mechanically positioned in accordance with the deviation of the aircraft about a selected reference control axis by a suitably oriented "position" gyro 50. Electrical signals are thus generated over lines 44 and 45 that are proportional to the deviation of the aicraft about this selected reference control axis. A second of these controlling signals may be derived from a second electrical pickoff 51 that may be of the same type as the first and including a potentiometer 52 energized by a voltage source 53 and having its movable slider 54 mechanically positioned by a suitably oriented rate gyro 55 or the like, and generating an electrical signal proportional to the rate of deviation of the aircraft about a control axis. Thus, by means of these two gyros, the aircraft may be both automatically stabilized about a predetermined axis for "position" deviation, and additionally corrected for transient "rate" motion. Similarly, other stabilizing elements for measuring acceleration, air speed, altitude, or any one of a number of other conditions (commonly used in controlling an aircraft) may be employed, all as well known in the art.

As also known in the automatic pilot art, either or both "rate" feedback and "acceleration" feedback may be employed in this system, by providing a rate determining tachometer 56 or acceleration response device connected to be driven by the shaft connected to the servomotor 26 and generating a signal degeneratively to said servo amplifier 42, proportional to either the rate of movement of servo motor 26 or the acceleration of servo motor 26, or both, all as desired.

Position feedback may be added, as shown, by providing a third spur gear 57 meshing with spur gear 30 and driven thereby. Spur gear 57 drives an electrical pickoff comprising slider 58 of an energized potentiometer 59 or the like, in accordance with the positioning of servo motor 26, thereby generating a position feedback signal to the servo amplifier 42 in opposition to the signals provided by the "position" gyro 50, the rate gyro 55, and/or other controlling signals.

For automatically maneuvering or otherwise guiding or stabilizing the aircraft through this control system, an additional command signal from an instrument landing system or other maneuvering system may be introduced into servo amplifier 42 in series with the above signals or over a parallel input line 60. As is well known in the art, all of these electrical signals are suitably combined within the servo amplifier 42, amplified, and applied over the output lines 43 thereof to energize the "damper actuator" servo motor 26 which, in turn, operates the valve stem 14 to position the aircraft control surface 10 until the resultant of these signals energizing the servo amplifier input is nullified.

To achieve a high rate of response, or otherwise stated, to provide a highly sensitive system for automatically stabilizing the aircraft, damping transient oscillations of the aircraft, and maneuvering the craft, the "damper actuator" mechanism is preferably a high speed, rapidly responding device, employing a fast-acting servo motor 26 and a gearing and sleeve mechanism 29 with only a limited threaded travel onto or off of the threaded push rod 28. With such a fast-acting mechanism, rapid and transient oscillations of the craft are detected by the rate gyro, accelerometer, or other anticipatory device or instrument, and quickly corrected by rapidly positioning the aircraft controller surface 10 without instability or undue time delay. However, since this damper mechanism is necessarily limited in its travel for rapid response, it cannot position valve stem 14 over its full range. Therefore, it cannot control large displacements of the aircraft surface 10 as may be needed for steady state "trimming" of the aircraft surface to compensate for weight unbalance, nor can it correct the aircraft for large positional deviations from a predetermined attitude or altitude as sensed by the position gyro 50, altimeter or the like. In addition, this short travel device cannot control large maneuvering displacements of the aicraft control surface 10.

In accordance with the present invention, therefore, the "feel trim" actuator 27, which is preferably a longer travel and therefore slower-acting actuator than the "damper actuator," is interconnected in a novel manner with the "damper actuator" linkage for determining from the "damper actuator" when larger displacements of the aircraft surface 10 are needed, and thereafter continuing the position of the controller surface 10 in a direction to aid the displacement that the "damper actuator" has commenced. Referring to the drawing, the two actuators are preferably interconnected by providing a substantially L-shaped arm 61, having one end thereof connected to the push rod 28 by suitable adjustable means, such as the threaded connection 62 shown, and supporting on its opposite free end two upstanding substantially L-shaped switch contact arms 63 and 64, arranged in confronting relation and on opposite sides of a switch blade 65, preferably affixed to and suspended from the valve stem 14. Switch blade 65 may be energized by a suitable source of voltage 66 and the two switch arms 63 and 64 may be electrically insulated by a suitable separator 67, as shown. Each of these switch contacts is then preferably connected to a different one of the two lines 68 and 69 leading to the reversing terminals of the "feel trim" motor 27. Thus, as switch blade 65 is urged to its forward position by movement of valve stem 14, and strikes the forward upstanding switch contact 64, the electrical line 69 is connected to source 66, energizing "feel trim" motor 27 to drive its shaft 40 outwardly and in a direction to urge the complete controlling linkage including vertical rod 38 and push rod 28, together with valve stem 14, in a forwardly direction, thereby continuing the displacement of aircraft surface 10 in the same direction as commanded by the "damper actuator" mechanism. Conversely, as the switch blade 65 is moved backwardly as the "damper actuator" mechanism withdraws valve stem 14 from valve 13 and switch blade 65 strikes the rear upstanding switch contact arm 63, line 68 is energized by the voltage source 66. In this instance, the "feel trim" motor shaft 40 is operated in the reverse direction, driving the control linkage and the push rod 28 backwardly in the opposite direction and continuing the movement of valve stem 14 out of the valve 13, thereby continuing the positioning of the aircraft control surface 10 in the opposite direction. Thus, this switching mechanism, being connected to detect the relative movement of the valve stem 14 referenced to the push rod 28, measures the expansion or contraction of the "damper actuator" linkage and, when these movements exceed the limits of the switch arms 63 and 64, the "feel trim" motor 27 is energized to continue the necessary displacement of the valve stem 14.

Considering the overall operation of this device for automatically "trimming" the control surface to balance a change in the weight distribution of the aircraft, as the aircraft undergoes a trim change caused by this shift in weight, the attitude of the aircraft momentarily changes and position gyro 50, sensing the change of attitude, transmits an electrical signal to the servo amplifier 42, energizing the "damper actuator" 26, which in turn positions valve stem 14 in a direction to correct for this deviation. As the valve stem 14 is driven, the switch blade 65 leaves its central position and shortly thereafter strikes one or the other of switch arm contacts 63 and 64, energizing the "feel trim" motor 27. The "feel trim" motor shaft 40 is thence driven and positions the vertical link 38 and the complete push rod 28 mechanism in a direction to increase the amount of control surface deflection initiated by operation of the "damper actuator." This increased deflection of the control surface 10 overcompensates for the deflection needed to return the aircraft to its reference heading and the aircraft is thus again momentarily varied from the attitude setting established by its position gyro 50. Gyro 50 thereafter generates a second electrical signal of reverse polarity through its pickoff 46, resulting in the "damper actuator" motor 26 being driven in the opposite direction, reversing the axial movement of valve stem 14 and withdrawing switch blade 65 from its contact with its limit switch contact 63 or 64. This interaction between the "damper actuator" and "feel trim" actuator is continued until the gyro signal is zeroed, indicating that the aircraft has returned to its preselected attitude and the control surface 10 is thus positioned by the "feel trim" actuator to compensate for the trim unbalance. Thus, the switch blade 65 is withdrawn from contact 64 and centered once again. By this illustration, it is obvious that the displacement of the "damper actuator" has been replaced by displacement of the "feel trim" actuator, which also positions the human pilot's control lever 24. By this unique interconnection of the "damper actuator" 26 and the "feel trim" actuator 27, automatic trimming of the aircraft is accomplished and the human pilot's control stick 24 is also positioned to indicate the steady state deviation of the control surface 10 from its streamline position. At the same time, the "damper actuator" is centered and in condition to respond to other transient conditions or commands from the automatic pilot mechanism, as desired, and the position feedback signal from pickoff 58 is "washed out" or zeroed.

Although this interconnection of the "damper actuator" 26 and the "feel trim" motor 27 ultimately centers the switch blade 65 of the damper actuator in its center position intermediate between switch blades 63 and 64, and the steady state positioning of the aircraft control surface 10 is ultimately taken over by the "feel trim" actuator 27, in some instances, depending upon the rapidity of the correction and the extent of deviation of the aircraft from the position attitude commanded by the gyro, a number of repetitions of the above procedure takes place. To more rapidly permit these corrections to be made and to prevent any possible resulting instability, a feedback signal proportional to the position of the "feel trim" actuator 27 may be obtained and this electrical signal may be directed backwardly into servo amplifier 42 and compared with the gyro signal. Referring to the drawing illustrating one manner by which this may be accomplished, a shaft 70 is positioned by shaft 40 of the "feel trim" actuator 27 and this shaft positions the movable slider 71 of an electrical pickoff generally designated 72. The potential from this electrical slider 71, which is proportional to the displacement of the "feel trim" actuator 27, is thence directed upwardly over line 73 and back to an input line of the servo amplifier 42. Thus, as the "feel trim" actuator 27 positions the push rod linkage 28, a feedback signal is generated to the servo amplifier 42 to balance out the gyro signal and de-energize the "damper actuator" motor 27, thereby rapidly enabling the correction by the combined "damper actuator" and "feel trim" motor 27 to be made.

Thus, by means of the present invention, the separate "maneuvering actuator" heretofore used for wide range deflection of the aircraft control surface 10 is eliminated and, by a novel interconnection of the high sensitivity "damper actuator" and slower speed "feel trim" actuator, a hybrid actuating system is provided which not only performs the functions heretofore provided by three separate actuators, but in addition permits automatic trimming of the aircraft control surface. Since many small damping motions of the "damper actuator" are within the dead band defined by the center detecting switches 63 and 64, the "feel trim" actuator is not energized and the pilot's manual control stick 24 is not moved and does not follow transient deviations of the aircraft. Additionally, since rapid movements of the "damper actuator" to correct for transient deviations of the aircraft are of high frequency, the "feel trim" actuator motor 27, being a relatively slow-moving device, is not energized for a sufficiently long time to operate the push rod linkage 28, even if, during these transient corrections by the damper, the switch blade 65 is driven to contact one or the other of the switch contacts 63 and 64. Consequently, the "damper actuator" operates freely to correct for transients and the "feel trim" actuator responds only for maneuvering and automatic trimming.

It is further to be noted that position feedback provided by the electrical pickoff 58 of the "damper actuator" is also extinguished, once the damper actuator mechanism is re-centered and the switch blade 65 is in its zero position.

Manually actuated means are provided for independently energizing the "feel trim" actuator control 27 if desired. As shown, this means is in the form of a switch box 75 containing a pivotally mounted switch blade 76 having one side thereof connected to a suitable source of voltage 77. The switch blade 76 may be actuated by a button 78 to connect source 77 to either of two switch contacts, 79 or 80 mounted within the switch box 75. When switch contact 79 is connected to source 77, the actuator motor 27 is energized through line 81 causing motor 27 to rotate in the same direction as it does when line 68 is energized. Conversely, when button 78 is actuated to connect the switch contact 80 with the source 77, then the motor 27 is energized through the line 82 causing motor 27 to rotate in the opposite direction. It should be noted that switch box 75 is mounted on the manual controller 24 and moves therewith; however, the switch blade 76 is only actuated by movement of button 78.

Although this invention has been disclosed in connection with an automatic pilot for dirigible craft, it is believed obvious to one skilled in the art that it may be applied equally as well to any combined manual and automatic positioning system. Similarly, it is believed obvious that many features of this invention may be performed in other ways. For example, the "damper actuator" mechanism may be hydraulic or electro-mechanical, as desired, together with the "feel trim" mechanism. Similarly, the interconnection between the "damper actuator" and "feel trim actuator" may be by means of mechanical, hydraulic, electro-mechanical, electro-hydraulic, or other known linkage. Moreover, this interconnection may be continuous rather than by means of the limit switch construction, as shown. That is, any incremental movement of the damper actuator may provide progressively increasing energization of the "feel trim" actuator. Since these and many other variations of this invention may be made by those skilled in the art, this invention is to be considered as being limited only by the following claims appended hereto.

What we claim as new and desire to secure by Letters Patent of the United States is:

1. In a system for positioning the control surface of an aircraft, a manual controller, a linkage interconnecting said controller and surface, reversibly operating driving means for positioning a portion of said linkage to position said surface without displacing the remaining portion of said linkage and manual controller, a second reversibly operating driving means for positioning said entire linkage and manual controller, and means interconnecting said first driving means and second driving means for energizing said second driving means to position said entire linkage upon predetermined displacements of said portion of said linkage.

2. In a system for positioning a movable control member of a dirigible craft, a manual controller, a linkage interconnecting said controller and control member, reversibly operating driving means energized by electrical signals for shortening and lengthening a portion of said linkage and thereby moving another portion of said linkage to position said control member without displacing said shortened and lengthened portion of said linkage and manual controller, said driving means being fast-acting in response to said electrical signals and effecting a relatively short displacement of said member within predetermined limits, a long travel and relatively slower-acting driving means for reversibly positioning said entire linkage and manual controller, and electrical means interconnecting said fast-acting and slower-acting driving means for energizing said slower acting means to continue the positioning of said member when said fast acting means has reached the extent of its limited travel and remains therein for a sufficient interval, enabling operation of said slower acting driving means.

3. In a system for reversibly deflecting a movable control surface of a dirigible craft, a manual controller, a linkage interconnecting said controller and control surface, reversibly operating means for lengthening and shortening a portion of said linkage and thereby moving another portion of said linkage to position said member without displacing said lengthened and shortened portion of said linkage and manual controller, second operating means for reversibly positioning said entire linkage and manual controller, and means interconnecting said reversibly operating means and said second operating means for selectively energizing said second operating means to reversibly position said member in response to a predetermined expansion and contraction of said linkage.

4. In a system for positioning a member, a manual controller, a linkage interconnecting said controller and member, reversibly operating driving means for positioning a portion of said linkage to position said member without displacing the remaining portion of said linkage and manual controller, a second reversibly acting driving means for positioning said entire linkage and manual controller and said member, said reversibly operating driving means being a high-speed rapidly responding mechanism for rapidly positioning said member over short ranges, and said second driving means being a slower acting mechanism for positioning said linkage and member over wider ranges, and means interconnecting said rapidly responding mechanism and slower acting mechanism for selectively energizing said slower responding means to continue the positioning of said member when said fast acting means has reached substantially steady state predetermined limit positions in either direction.

5. In a system for positioning a member, a manual controller, a linkage interconnecting said controller and member, reversibly operating driving means energized by electrical signals for shortening and lengthing a portion of said linkage and thereby moving another portion of said linkage to position said member without displacing said shortened and lengthened portion of said linkage and manual controller, said means being fast-acting in response to said electrical signals and effecting a relatively short expansion and contraction of said portion of said linkage between predetermined limits, a long travel and relatively slower acting driving means for reversibly positioning said entire linkage, manual controller, and member in response to electrical signals; and electrical means interconnecting said fast-acting and slower acting driving means for energizing said slower acting means to continue the positioning of said member when said fact-acting means has reached a pre-determined position of its limited travel, and has remained therein for a time period sufficiently long to enable operation of said slower acting means.

6. In a system for positioning a member, a manual controller, a linkage interconnecting said controller and member, rapidly responding means for lengthening or shortening a portion of said linkage in response to electrical signals, slower moving means for reversibly positioning said entire linkage and manual controller in response to driving signals, and limit detecting means for selectively determining when said portion of said linkage has been shortened a predetermined amount or lengthened a predetermined amount for generating said driving signals to energize said slower moving means for positioning said entire linkage and manual controller to deflect said member in the same direction as said rapidly responding means.

7. In a system for rapidly positioning a member over short ranges and more slowly positioning said member over wide ranges, a first reversibly operating positioning means responsive to signals for rapidly positioning said member over short ranges, a second reversibly operating positioning means for more slowly positioning said member over wide ranges, and means responsive to displacement of said first positioning means for energizing said second positioning means to continue the displacement of said member in the same direction.

8. In a system for rapidly positioning a member over short ranges and more slowly positioning said member over wide ranges, a first reversibly operating positioning means responsive to signals for rapidly positioning said member over short ranges, a second reversibly operating positioning means for more slowly positioning said member over wide ranges, means responsive to displacement of said first positioning means for energizing said second positioning means to continue the displacement of said member in the same direction, and means responsive to the displacement of said second positioning means to generate a feedback signal to said first means.

9. In a system for positioning the control surface of an aircraft, a manual controller, a linkage interconnecting said controller and surface, reversibly operating driving means for positioning a portion of said linkage to position said surface without displacing the remaining portion of said linkage and manual controller, a second reversibly operating driving means for positioning said entire linkage and manual controller, and means interconnecting said first driving means and second driving means for energizing said second driving means to position said entire linkage upon predetermined displacement of said positioned portion of said linkage, and means responsive to displacement of said second driving means for feeding back a signal to energize said first driving means.

10. In a system for positioning a manual control member of a dirigible craft, a manual controller, a linkage interconnecting said controller and control member, reversibly operating driving means energized by electrical signals for shortening and lengthening a portion of said linkage and thereby moving another portion of said linkage to position said control member without displacing said shortened and lengthened portion of said linkage and manual controller, said driving means being fast-acting in response to said electrical signals and effecting a relatively short displacement of said member within predetermined limits, a long travel and relatively slower acting driving means for reversibly positioning said entire linkage and manual controller, electrical means interconnecting said fast-acting and slower acting driving means for energizing said slower acting driving means to continue the positioning of said member when said fast-acting means has reached the extent of its limited travel and remained therein for a sufficient interval enabling operation of said slower-acting driving means, and means responsive to displacement of said slower-acting driving means for feeding back a signal to energize said fast-acting driving means.

11. In a system for reversibly deflecting the movable control surface of a dirigible craft, a manual controller, a linkage interconnecting said controller and control surface, reversibly operating first driving means for lengthening and shortening a portion of said linkage and thereby moving another portion of said linkage to position said member without displacing said lengthened and shortened portion of said linkage and manual controller, second driving means for reversibly positioning said entire linkage and manual controller, means interconnecting said first driving means and second driving means for energizing said second driving means to reversibly position said member selectively in response to predetermined steady-state expansions and contractions of said linkage, and means responsive to the positioning of said second driving means for feeding back a signal to energize said first driving means.

12. In a system for positioning a member, a manual controller, a linkage interconnecting said controller and member, reversibly operating first driving means for positioning a portion of said linkage to position said member without displacing the remaining portions of said linkage and manual controller, a second reversibly acting driving means for positioning said entire linkage and manual controller and said member, said first driving means being a high speed, rapidly responding mechanism for rapidly positioning said member, means interconnecting said first driving means and said second driving means for selectively energizing said second driving means to continue the positioning of said member when said first means has reached substantially steady-state predetermined limit positions in either the forward or the reverse positions, and means responsive to displacement of said second driving means for feeding back a signal to energize said first means.

13. In a system for positioning a member, a manual controller, a linkage interconnecting said controller and member, reversibly operating driving means energized by electrical signals for shortening and lengthening a portion of said linkage and thereby moving another portion of said linkage to position said member without displacing said shortened and lengthened portion of said linkage and manual controller, said means being fast-acting in response to said electrical signals and effecting a relatively short expansion and contraction of the portion of said linkage between predetermined limits, a long travel and relatively slow-acting driving means for reversibly positioning said entire linkage, manual controller, and member in response to electrical signals; electrical connecting means coupling said fast-acting and slower-acting driving means for energizing said slower acting driving means to continue the positioning of said member when said fast-acting means has reached a predetermined position of its limited travel and has remained therein for a time period sufficiently long to enable operation of said slower acting means, and electrical means interconnecting said slower acting driving means and said fast-acting driving means and responsive to displacement of said slower-acting driving means for feeding back a signal to energize said fast-acting driving means.

14. In a system for positioning a member, a manual controller, a linkage interconnecting said controller and member, rapidly responding means for lengthening or shortening a portion of said linkage to deflect said member in response to electrical signals, slower moving means for reversibly positioning said entire linkage and manual controller in response to driving signals, and limit detecting means for selectively determining when said portion of said linkage has been shortened a predetermined amount or lengthened a predetermined amount for generating said driving signals to energize said slower-moving means for positioning said entire linkage and manual controller to deflect said member in the same direction as said rapidly responding means, and follow-up means responsive to positioning of said slower moving means for generating a signal to energize said rapidly responding means.

15. In a system for both automatically and manually positioning the control surface of an aircraft without interaction, a manual controller, a spring restrain linkage interconnecting said controller and surface, rapidly responding means for lengthening or shortening a portion of said linkage to deflect said control surface in response to electrical signals, slower moving means for reversibly positioning said entire linkage and manual controller against said spring restraint in response to driving signals, limit detecting means for selectively determining when said portion of said linkage has been shortened a predetermined amount or lengthened a predetermined amount for generating said driving signals, enabling said slower moving means to deflect said control surface in the same direction as said rapidly responding means, means responsive to positioning of said slower moving means for feeding back a signal to energize said rapidly responding means, automatic control means for energizing said rapidly responding means to stabilize and control said aircraft, and manually actuated means for independently energizing said slower moving means.

16. In a system for positioning the control surface of an aircraft, a manual controller, a linkage interconnecting said controller and surface, reversibly operating driving means for positioning a portion of said linkage proximate said surface to position said surface without displacing the remaining portion of said linkage and manual controller, a second reversibly operating driving means for positioning said entire linkage and manual controller, means interconnecting said first driving means and second driving means for energizing said second driving means to position said entire linkage upon predetermined displacement of said portion of said linkage, and means responsive to displacement of said second driving means for feeding back a signal to energize said first driving means, automatic control means for energizing said first driving means to automatically control and stabilize said aircraft, and manually actuatable means for independently energizing said second driving means to enable steady-state positioning of said control surface in response to manual control.

References Cited in the file of this patent

UNITED STATES PATENTS

| | | |
|---|---|---|
| 2,475,484 | De Nise | July 5, 1949 |
| 2,568,719 | Curry | Sept. 25, 1951 |
| 2,686,896 | Mathews | Aug. 17, 1954 |